United States Patent [19]

Ullman, Jr.

[11] 4,116,513
[45] Sep. 26, 1978

[54] DRAWER CONSTRUCTION

[75] Inventor: Myron E. Ullman, Jr., Canfield, Ohio

[73] Assignee: Kessler Products Company, Youngstown, Ohio

[21] Appl. No.: 760,084

[22] Filed: Jan. 17, 1977

[51] Int. Cl.² .......................................... A47B 88/00
[52] U.S. Cl. ................................... 312/330 R; 29/450;
52/309.1; 52/658; 40/155; 160/381; 220/7;
312/258; 403/402
[58] Field of Search ........................... 312/330 R, 258;
403/401, 402; 229/30; 52/658, 309.1, 309.13;
29/450, 526; 220/7, 8; 160/381; 40/155

[56] References Cited

U.S. PATENT DOCUMENTS

| | | | |
|---|---|---|---|
| 3,282,635 | 11/1966 | Himelreich | 312/330 |
| 3,321,223 | 5/1967 | Snow et al. | 403/401 |
| 3,556,626 | 1/1971 | Schock | 312/330 |
| 3,687,512 | 8/1972 | Alston | 312/330 |
| 3,826,554 | 7/1974 | Cornell | 312/330 |

FOREIGN PATENT DOCUMENTS

| | | | |
|---|---|---|---|
| 1,464,679 | 1/1967 | France | 403/402 |
| 2,426,722 | 12/1975 | Fed. Rep. of Germany | 403/401 |

*Primary Examiner*—Mervin Stein
*Assistant Examiner*—Alex Grosz

*Attorney, Agent, or Firm*—David A. Burge Co.

[57] ABSTRACT

A tight-fitting corner construction is provided for use between adjacent, integrally connected parts of a common panel. A specially configured, three-sided miter groove is formed between the panel parts, and the panel is folded to close the groove and to form a corner between the panel parts. An overhanging lip is provided on one of the panel parts along one side of the groove. When the panel is folded to form a corner, the lip is brought into overlying engagement with inner surface portions of the other panel part to effect a thorough, tight-fitting closure of the groove. The panel preferably comprises a hollow, elongated plastic member which is used to form the sides and back of a drawer frame. Snap-acting locking devices are carried in hollow portions of the panel adjacent the corner locations to lock the panel in its folded configuration. A drawer front carries connectors which project into hollow portions of the drawer sides. Button-like locking formations are carried on the connectors and project into holes formed in interior portions of the drawer sides. Neither the snap-acting locking devices nor the drawer front connectors are exposed to view once the drawer construction is completed. Methods of forming panel corner connections and drawer constructions of the foregoing type are also described.

22 Claims, 13 Drawing Figures

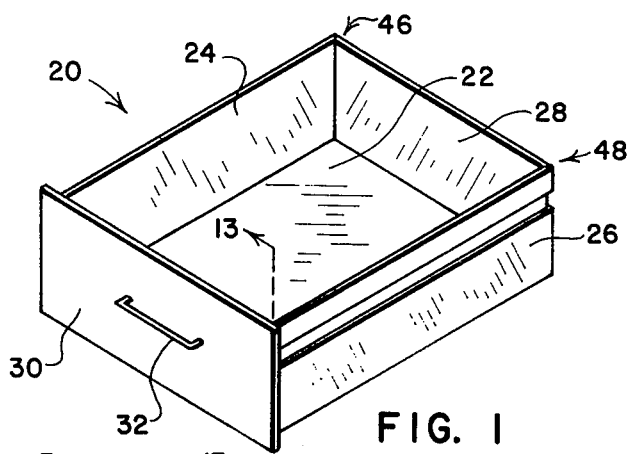
FIG. 1
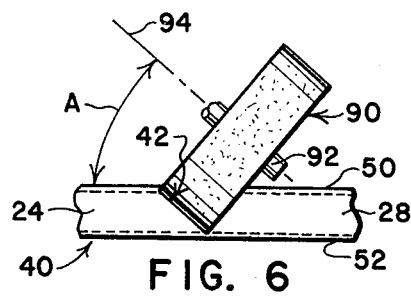
FIG. 6
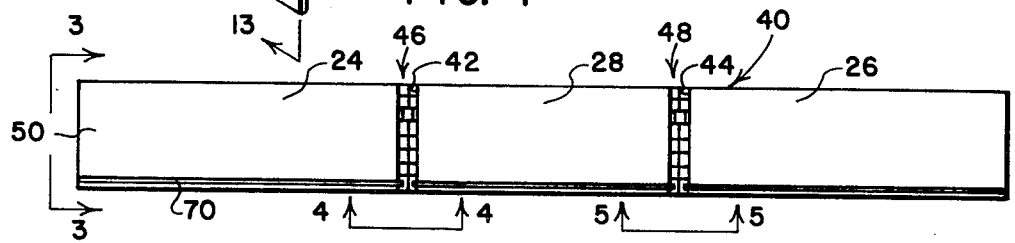
FIG. 2
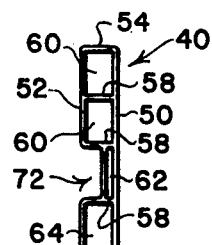
FIG. 3
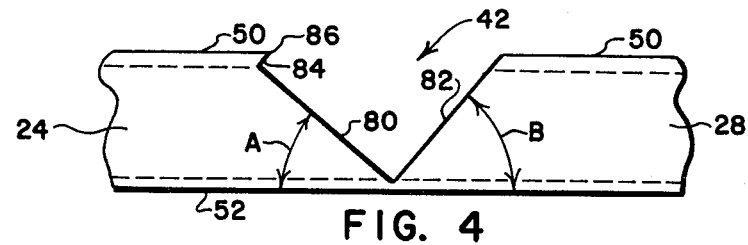
FIG. 4
FIG. 5
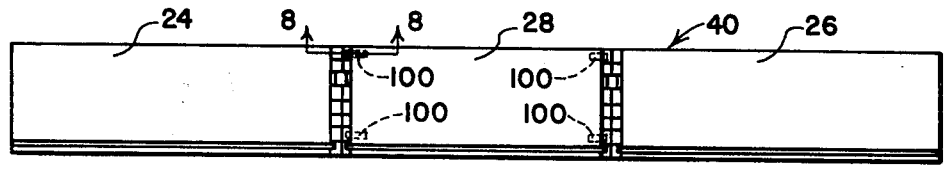
FIG. 7
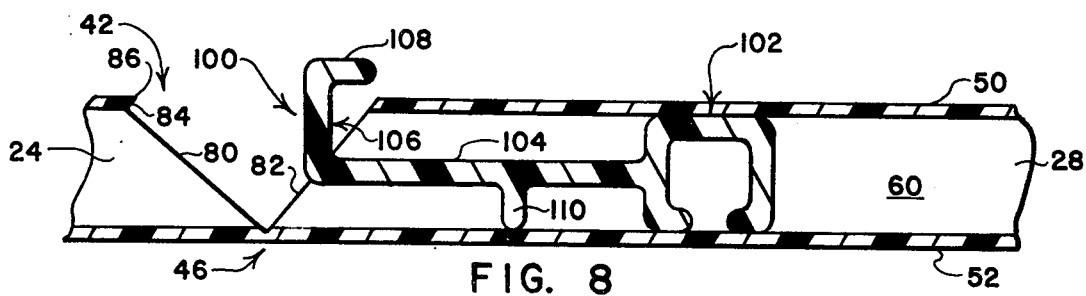
FIG. 8

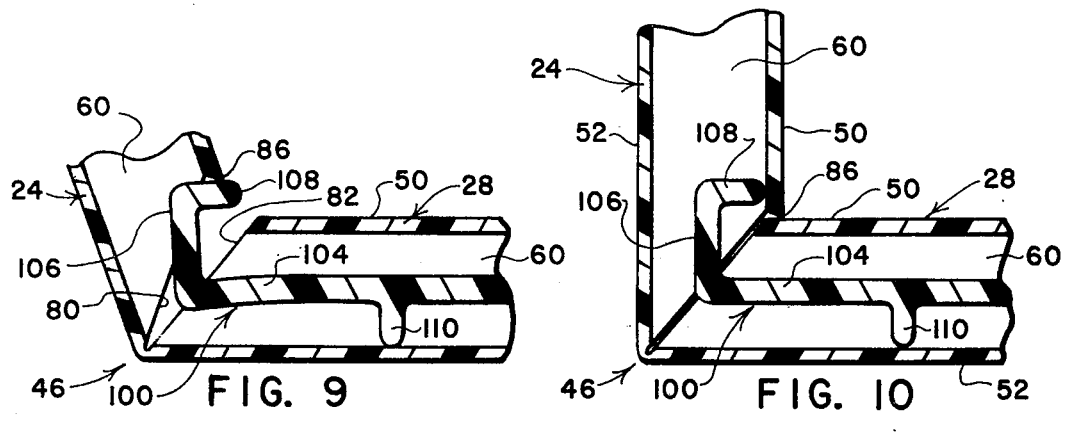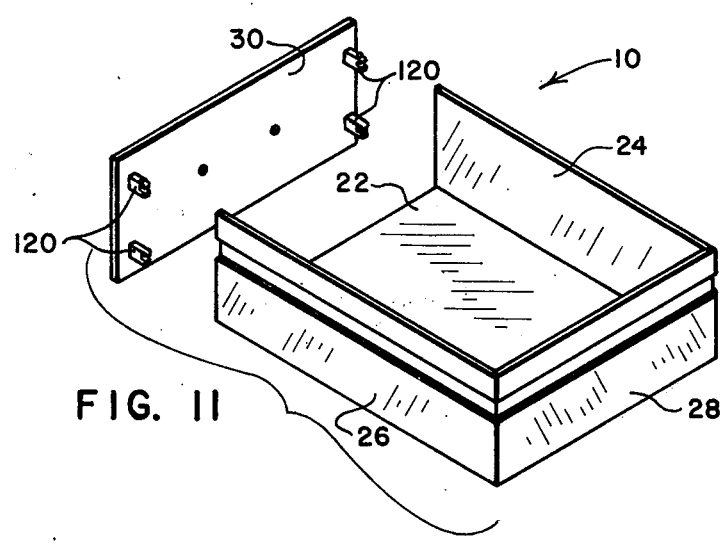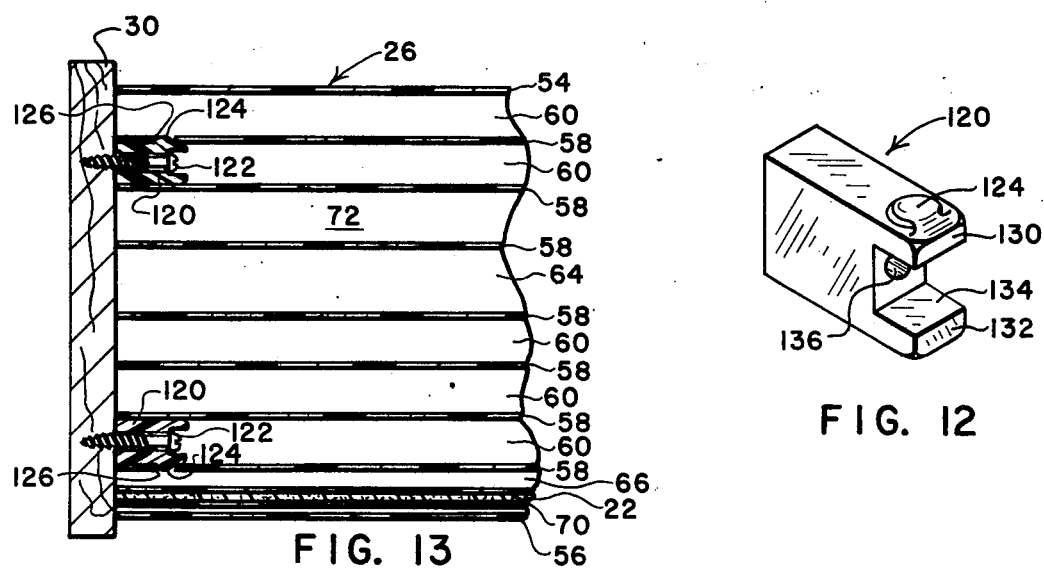

DRAWER CONSTRUCTION

CROSS REFERENCE TO RELEVANT PATENT

Multi-Size Drawer Construction, U.S. Pat. No. 3,726,579, issued Apr. 10, 1973 to Myron E. Ullman, Jr., hereinafter referred to as the "Drawer Patent".

BACKGROUND OF THE INVENTION

1. Field of the Invention

The present invention relates to novel and improved corner constructions for connecting adjacent panel walls, to drawer constructions employing the novel and improved corner constructions, and to methods of forming corner and drawer constructions.

2. Prior Art

In the manufacture of sliding drawers and other box-like containers having upstanding walls surrounding a bottom panel, it is known to form selected ones of the upstanding walls from plastics material. Drawers for kitchen cabinets, for example, commonly employ sides and backs formed from hollow, extruded plastic strips, and fronts formed from wood, chipboard, or other decoratively finished material.

A problem commonly encountered in the fabrication of drawers and other containers of this type is that of forming secure, rigid, attractive corner connections between adjacent, upstanding, extruded plastic wall members. Another problem is that of forming secure, rigid and attractive connections between drawer fronts formed of decoratively finished material and drawer sides formed of extruded plastics material.

A common approach which has been taken in an effort to provide good corner connections between adjacent, upstanding, extruded plastic wall members calls for the use of corner connection pieces having formations which extend into hollow ends of the wall members. Both rigid and hinged corner connection pieces have been proposed, and most proposals call for the corner pieces to be formed by injection molding.

The approach of using corner connection pieces has several drawbacks. Difficulties are encountered in maintaining a good color match between the extruded wall members and the injection molded corner pieces. Since wall members of different heights are required to provide drawers of a variety of depths, the manufacturer is required to maintain an inventory of many different sizes of corner connection pieces. Still another drawback of this type of corner connection approach is that the tolerances involved in forming the various interfitting components often result in the formation of loose fitting connections among the components. Even where tight fitting connections result, the presence of a plurality of joint connection cracks on the inside and outside surfaces of the drawer at each corner location gives an undesirable appearance.

Another approach which has been proposed is that of forming adjacent ones of the upstanding walls integrally from a single extruded plastic strip. The referenced Drawer Patent describes one proposal of this type, but does not address the problem of providing smooth inner and outer surface corner connections between adjacent upstanding walls formed from hollow plastic extrusions. Another proposal of this type has called for the use of 45 degree cuts made in the inner wall surface of a hollow extruded strip to form V-shaped miter grooves that will permit the strip to be folded at corner locations to form right-angle corners between the sides and back of a drawer. This latter proposal utilizes a folding corner block assembly which is inserted into the hollow ends of the sides and back. After the corner block is inserted, the corner assembly must be glued to maintain its rigidity, and the corner crack formed on the inside drawer surface must be filled to give an acceptable appearance.

Attempts to provide suitable integral corner connections between adjacent upstanding walls formed from hollow, extruded plastics material have not achieved good commercial acceptance. The hollow, extruded plastics material used to form drawer sides and backs have inner and outer walls that vary to some degree in thickness and spacing. Moreover, the inner and outer wall surfaces are seldom perfectly flat. No matter how carefully conventional V-shaped miter grooves are formed in these materials, many of the resulting folded corner formations will have unevenly mating inner edges presenting unsightly corner cracks.

In some drawer construction applications, it is desirable to form rigid, locked corner connections between adjacent upstanding wall members. A problem common to all known prior corner connection proposals which provide rigidly locked corner connections is that they are not well adapted for field assembly. Where a plurality of parts are required to form corner assemblies, it is not uncommon for some of the parts to be lost or misplaced or broken during shipment and assembly, causing delays while replacements are obtained. Where the assembly steps require the use of bonding agents of separately inserted pins or other fasteners, the possibility of improper field assembly is of concern. Gluing and crack filling operations are time consuming and tedious even when carried out in a controlled factory environment by experienced workmen, and these operations are not well adapted for use by inexperienced personnel at an installation site.

SUMMARY OF THE INVENTION

The present invention overcomes the foregoing and other drawbacks of prior proposals by providing novel and improved corner constructions for use between adjacent intersecting panels, such as the upstanding walls of a drawer, together with novel and improved methods of forming corner and drawer constructions.

In accordance with one feature of the present invention, a tight-fitting integral corner connection is formed between first and second adjacent parts of a panel. An elongated miter groove of novel configuration is formed across the panel between the adjacent panel parts. A pointed lip which overhangs the groove is provided on one of the panel parts along one side of the groove. The panel is folded to close the groove and to form a corner between the panel parts. When the panel is in its folded configuration, the lip overlies and engages inner surface portions of the other panel part, thereby effecting a tight-fitting closure of the groove.

In preferred practice, the miter groove is defined by three groove sides which extend the full length of the groove and have unequal widths. A first groove side is formed in the first panel part and extends from the inner surface thereof to a groove bottom located near the outer surface. A second groove side is formed in the second panel part and extends from the groove bottom toward the inner surface of the second panel part. The second groove side is wider than the first groove side. A third groove side is formed in the second panel part and extends from the inner surface thereof toward and into intersection with the second groove side. The third groove side is substantially narrower than the first groove side and cooperates with the inner surface of the second panel part to define the pointed lip which extends along one side of the groove.

The first and third groove sides preferably extend in substantially parallel planes. The second groove side preferably extends in a plane which forms an included angle of about 90 degrees between the first and second sides. The third groove side preferably has a width which equals about the difference in widths between the second and first groove sides.

It has been found that a particularly good, tight-fitting corner construction is provided where the first groove side is inclined at an angle of about 50° relative to the planes of the inner and outer surfaces of the first panel part, where the second groove side is inclined at an angle of about 40 degrees relative to the planes of the inner and outer surfaces of the second panel part, and where the included angle formed between the first and second groove sides when the planes of the inner and outer surfaces of both panel parts are parallel is about 87°. The 87° included angle is provided by increasing the magnitude of one or both of the 40 and 50° angles by 1° to 3°, whereby, for example, angles of 42° and 51° may be used to give a resulting included angle of 87°.

In accordance with another feature of the present invention, where the described corner constructions are employed between the sides and back of a drawer frame, the overhanging lips are preferably formed on the sides of the drawer such that they will overlie and engage inner surface portions of the back to form tight-fitting corner connections which have an especially good appearance when viewed from the front side of the drawer.

In accordance with another feature of the invention, the specially configured, three-sided miter grooves are preferably formed using a rotating grinding wheel. The wheel has a cylindrical outer surface which has an axial length equal to the width of the second groove side. All three groove sides are formed in a single pass of the grinding wheel through the panel, with the second groove side being formed by the outer surface of the wheel, and the first and third groove sides being formed by opposite end surfaces of the rotating wheel.

In preferred practice, an elongated, hollow, extruded plastic panel is used to form two sides and a back of a drawer frame. Snap-acting locking devices are positioned in hollow portions of the drawer back adjacent the corner locations, and have locking parts which snap into hollow portions of the drawer sides when the pointed lips are brought into compressive engagement with inner surface portions of the back. The snap-acting locking devices are formed from plastics material, and their movable locking parts are configured to bias the pointed lips into firm engagement with inner surface portions of the back. The movable locking parts project out of their associated grooves prior to the panel's being folded to form corners between the sides and back, and are deflected inwardly by the pointed lips as the panel is folded to form the corners.

A feature of the described tight-fitting corner construction is that it entirely conceals the snap-acting locking devices from view. Inasmuch as adjacent panel parts are formed from a common extrusion, and since the locking devices are fully concealed, there is no problem of color match among the components of the corner construction.

A further feature of the described corner construction is that no corner-crack is provided along the outer surface of the corner connection, and only a single, tight-fitting line of juncture is visible along the inner surface of the corner construction. This arrangement is a substantial improvement over prior proposals.

Still another feature of the corner construction is that it compensates for tolerance variations among its components. If the surfaces of the panel parts are not perfectly flat, as is often the case, the overlapping arrangement provided by the pointed lip on one panel portion compressively engaging inner surface portions of the other panel portion nonetheless provides a corner connection of good appearance. The lip conceals any crack which may remain between the first and second sides of the closed groove. The spring-acting nature of the locking devices also serves to compensate for normal variations in wall thickness and the like.

The snap-acting locking devices can be installed at the factor and the panel parts shipped flat to conserve space and minimize shipping costs. Forming a drawer frame at the installation site requires no application of adhesive or manipulation of fasteners, and is effected by a simple folding of the panel parts to form corners, whereupon the locking devices snap-act to retain tight-fitting engagement among the corner components. Since the snap-acting locking devices can be used with any height of upstanding wall, they obviate the need to maintain a large inventory of different sized corner connection pieces.

In accordance with another feature of the preferred practice of the present invention, drawer fronts are secured to sides of the described drawer frame by connectors which extend into hollow channels formed in the drawer sides. The connectors are secured to an inner surface of the drawer front with suitable fastening means such as threaded fasteners. The connectors carry raised, button-like projections which engage punched holes formed in the drawer sides. The holes are preferably located in web portions which are concealed from view once connections have been completed between the front and sides. The connectors are concealed from view by the drawer sides, giving a good outer appearance to the drawer front-to-side connections.

The use of drawer front connectors of this type permits drawer fronts and drawer frame members to be shipped separately without concern that they will be assembled improperly at the installation site. The snap-together nature of the drawer front-to-side connections simplifies drawer assembly and, when combined with the described snap-locking frame corner constructions, provides a drawer construction which can be assembled in a matter of seconds by unskilled personnel at an installation site.

As will be apparent from the foregoing summary, it is one general object of the present invention to provide novel and improved corner constructions for use between adjacent walls of drawers and the like. It is another general object to provide novel and improved methods of forming corner constructions and drawer constructions.

It is another object to provide a drawer or container frame that can be shipped flat and folded at an installation site to form tight-fitting corner connections. It is another object to provide such a frame with snap-acting locking devices which will maintain tight-fitting engagement between corner components once the frame has been folded to form corners.

Still another object is to provide a simple means of attaching a drawer front to hollow, extruded drawer sides by means of connectors which are entirely hidden from view once the front-to-side connections are effected.

These and other objects and a fuller understanding of the invention described and claimed in the present application may be had by referring to the following description and claims taken in conjunction with the accompanying drawings.

BRIEF DESCRIPTION OF THE DRAWINGS

FIG. 1 is a perspective view of a drawer assembly embodying the preferred practice of the present invention;

FIG. 2 is an inside side elevational view of a member used to form the back and sidewalls of the drawer assembly of FIG. 1;

FIG. 3 is an enlarged end elevational view as seen from a plane indicated by a line 3—3 in FIG. 2;

FIGS. 4 and 5 are enlarged bottom plan views as seen from planes indicated by lines 4—4 and 5—5 in FIG. 2;

FIG. 6 is a bottom plan view similar to FIG. 4 and illustrating how a grinding wheel is used to form miter grooves in the member shown in FIG. 2;

FIG. 7 is an inside side elevational view of the member shown in FIG. 2 with corner locking devices installed therein;

FIG. 8 is an enlarged sectional view as seen from a plane indicated by a line 8—8 in FIG. 7;

FIGS. 9 and 10 are sectional views similar to FIG. 8 and illustrating the procedure used to form a locked corner construction with the assembly of FIG. 7;

FIG. 11 is an exploded perspective view of the drawer assembly of FIG. 1 and showing connection devices which are used to connect the drawer front to the sidewalls;

FIG. 12 is an enlarged perspective view of one of the projection devices shown in FIG. 11; and, FIG. 13 is an enlarged sectional view as seen from a plane indicated by a line 13—13 in FIG. 1.

DESCRIPTION OF THE PREFERRED EMBODIMENT

Referring to FIG. 1, a drawer assembly embodying the preferred practice of the present invention is indicated generally by the numeral 20. The drawer assembly 20 has a bottom panel 22 and four upstanding walls including two sides 24, 26, a back 28, and a front 30. A drawer pull 32 is mounted on the front 30.

The bottom panel 22 and the drawer front are preferably formed from composition materials such as resin-bonded chipboard. The sides 24, 26 and the back 28 are preferably formed from plastic such as hard P.V.C. or other suitable plastics material.

Referring to FIG. 2, the sides 24, 26 and the back 28 are formed from a single, continuous strip of hollow, extruded plastic material, indicated generally by the numeral 40. As will be explained in greater detail, two transversely extending miter grooves 42, 44 are formed in the extruded strip 40 at corner locations 46, 48 between adjacent ends of the sides 24, 26 and the back 28. The strip 40 is folded at the corner locations 46, 48 to form right-angle corners between the sides 24, 26 and the back 28. The grooves 42, 44 have a novel configuration which assures that they close fully when the member 40 is folded to form corners at the locations 46, 48.

Referring to FIG. 3, exterior surfaces of the extruded strip 40 are defined by inner and outer walls 50, 52, and by top and bottom walls 54, 56. A plurality of reinforcing webs 58 interconnect the inner and outer walls 50, 52 at vertically spaced locations between the top and bottom walls 54, 56. A plurality of elongated channels 60, 62, 64, 66 are defined between the inner and outer walls 54, 56 and extend the full length of the strip 40. The channels 60 are dimensionally identical in cross-section.

A recess 70 is formed in the inner wall 50 near its juncture with the bottom wall 54. The recess 70 is configured to receive edge portions of the bottom panel 22. A wider recess 72 is formed in the outer wall 52 to receive such drawer slides as may be used to guide and support opposite sides of the drawer 10 for sliding movement in a kitchen cabinet of other furniture enclosure.

Referring to FIGS. 4 and 5, the miter grooves 42, 44 entirely sever the inner wall 50 as well as the top and bottom walls 54, 56 and the reinforcing webs 58. While the grooves 42, 44 sever the outer wall 52 in the vicinity of the recess 72, they do not sever other portions of the outer wall 52 which remain intact to form integral connections between the sides 24, 26 and the back 28.

Referring to FIG. 4, the groove 42 has three sides 80, 82, 84. The side 80 is the widest of the three sides, and it is oriented at an angle "A" relative to the planes of the inner and outer walls 50, 52. The side 82 is slightly narrower than the side 80 and is oriented at an angle "B" relative to the planes of the inner and outer walls 50, 52. The side 84 is the narrowest of the three sides and extends in a plane which parallels the side 82. The narrowest side 84 forms a pointed lip 86 which overhangs the widest side 80. In preferred practice, the narrowest side 84 extends parallel to the side 82 and has a width equal to about the difference between the widths of the sides 80, 82.

Adjacent ones of the sides 80, 82, 84 intersect at about 90° angles. The angle "A" is selected to be slightly less than the angle "B" in order that the side 80 will be slightly longer than the side 82. The angle "A" is selected to be about 40°, and the angle "B" is selected to be about 50°. A feature of this type of miter groove formation is that, when the member 40 is folded to form a corner between the sides 24 and the back 28, the narrowest side 84 will overlie a portion of the inner wall 50, as is best seen in FIG. 10, thereby effecting a full and secure closure of the groove 42. When the member 40 has been folded as shown in FIG. 10, the pointed lip 86 presses against the inner wall 50 and provides a tight fitting corner connection between the sides 24 and the back 28.

In preferred practice, the included angle between the sides 80, 82 is selected to be about 87°. It has been found that an 87° angle provides a particularly good fit when the member is folded to form a corner at the location 42. An 87 degree included angle is obtained by increasing the magnitude of one or both of the angles "A" and "B", whereby, for example, the angle "A" may be 51° and the angle "B" may be 42°.

Referring to FIG. 6, the groove 42 is preferably formed using a rotating grinding wheel 90. The grinding wheel 90 is supported for rotation on a drive shaft 92. The drive shaft 92 has an axis of rotation 94 which is oriented at the angle "A" relative to the planes of the inner and outer surfaces 50, 52. The groove 42 is formed by moving the member 40 beneath the grinding wheel 90 along a path of movement which is transverse to the length of the member 40.

Referring to FIG. 5, the groove 44 is a mirror reversal of the groove 42 and has sides 80', 82', 84' and a lip 86' which are identical to the sides 80, 82, 84 and the lip 86. The groove 44 is preferably ground using an appropriately oriented grinding wheel, as described in conjunction with the discussion of FIG. 6.

Referring to FIGS. 7 and 8, four locking devices 100 are inserted into the channels 60 in the back 28. The locking devices 100 are operative to maintain the folded configuration of the member 40 once it has been folded to form corners at the location 46, 48.

The locking devices 100 are of identical construction and are formed from plastic such as rigid P.V.C. or other suitable plastics material. Referring to FIG. 8, each of the locking devices 100 has an enlarged inner end formation 102 which is configured to fit relatively snugly in one of the channels 60. Each of the locking devices 100 has an elongated central portion 104 which connects the enlarged end formation 102 with a U-shaped structure 106 formed at its opposite end. The U-shaped structures 106 have tabs 108 which extend out of the open grooves 42, 44. A fulcrum projection 110 depends from each of the central portions 104 for engaging the inner surface of the outer wall 52.

The locking devices 100 are inserted in selected ones of the back channels 60 and are positioned as shown in FIG. 8 with their tabs 108 overlying portions of the groove sides 82, 82'. A suitable bonding agent is used to form a permanent connection between the inner end formations 102 of the locking devices 100 and the back 28.

Referring to FIGS. 9 and 10, as the member 40 is folded at the corner location 46 to form a right-angle corner between the side 24 and the back 28, the pointed lip 86 engages the associated tabs 108 and depresses them into the channel 60 as required to permit the lip 86 to pass over the tabs 108 to a position where the lip 86 engages the inner wall 50. Once the member 40 has been folded to form a right-angle corner, the tabs 108 snap upwardly and engage the inner surface of the inner wall 50, as shown in FIG. 10, thereby locking the member 40 in its folded configuration.

A feature of the described corner construction is that the locking devices 100 can be installed at the factory and the members 40 can be shipped in an unfolded, flat configuration to the installation site. Fabrication of a three-sided drawer frame at the installation site requires no assembling of separate parts and no use of adhesives or other bonding agents. The member 40 is simply folded as has been described to form corners between the sides 24, 26 and the back 28. The snap-acting locking devices 100 maintain the configuration of the member 40 once it has been folded, and the overlapping engagement provided by the lips 86 pressing firmly against the inner wall 50 provides secure, tight fitting corner connections that require no gluing or filling.

Referring to FIGS. 11-13, in accordance with another feature of the present invention, connection members 120 of simple and inexpensive construction are used to interconnect the sides 24, 26 and the front 30. The connection member 120 are elongated block-like structures formed of nylon or high impact resistant styrene or other suitable plastics material. The connection members 120 are attached by screws 122 to the front 30 and are configured to slip fit within selected ones of the channels 60. The connection members 120 carry raised, button-like projections 124 which snap into holes 126 formed in selected ones of the reinforcing webs 58 to form permanent connections between the front 30 and the sides 24, 26.

Referring to FIG. 12, each of the connection members 120 has a pair of overlying tabs 130, 132 which define a groove 134 therebetween. Each of the connection members 120 has a hole 136 extending centrally therethrough and opening into the groove 134. The holes 136 are configured to receive the mounting screws 122. The button-like projections 124 are carried on the tabs 130. Inner ends of the tabs 130, 132 and inner portions of the button-like projections 124 are tapered and rounded to facilitate insertion of the connection members 120 into the channels 60.

As will be apparent from the foregoing description, the present invention provides a simple drawer construction system, the components of which can be fabricated simply and shipped in flat cartons to an installation site for snap-together assembly. Connections formed between the several upstanding walls of the resulting drawer assemblies are tight, rigid and attractive in appearance.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A drawer construction wherein a drawer side formation and a drawer back formation are formed integrally from a single, hollow, extruded plastic member which is folded along a miter-groove at a corner location between the side and back formations to form a corner of a drawer, and including snap-acting locking means carried in hollow portions of a selected one of the side and back formations at the location of a corner to be formed between these formations, the snap-acting locking means being operable when the formations are folded to close the miter groove lying therebetween to engage hollow portions of the other of these formations, for maintaining the folded configuration of these formations.

2. The drawer construction of claim 1 wherein the snap-acting locking means is concealed by the formations when the formations are in their folded configuration.

3. The drawer construction of claim 1 wherein the snap-acting locking means includes a plurality of snap-acting devices which snap-act to interconnect the side and back formations when the member is folded.

4. A drawer construction wherein drawer sides and a drawer back are formed integrally from a single, hollow, extruded plastic member which is folded along miter-grooves at corner locations between the sides and back to form corners of a drawer, and wherein snap-acting locking means are carried in hollow portions of selected of the sides and back at the corner locations, the snap-acting locking means being operable, when the sides and back are folded to close the miter-grooves lying therebetween, to engage hollow portions of the member to maintain the folded configuration of the member, and a drawer front having connectors secured thereto and extending into open ends of the drawer sides for establishing secure connections between the drawer front and the sides, the connectors carrying button-like projections which extend into holes formed in the drawer sides, the holes being formed at locations on the drawer sides which are not visible from either inside or outside the drawer once connections have been completed between the drawer sides and front.

5. A drawer assembly, comprising:
  (a) a pair of sidewalls, a back, a front, and a bottom panel;
  (b) at least the sidewalls and the back being formed from a single strip of extruded plastic material and folded at corner locations between the sidewalls and the back;
  (c) the strip being smooth and continuous on the side forming outside surfaces of the drawer;
  (d) the strip having transversely extending miter grooves at the corner locations in the side forming inside surfaces of the drawer, the grooves being provided with formations which conceal such miter groove cracks as remain when the strip is folded to close the grooves and to form corners between the sidewalls and the back;
  (e) each of the grooves being defined by groove sides of unequal width, including:
    (i) a first groove side formed in the back and extending from the inner surface thereof to a groove bottom near the outer surface thereof;
    (ii) a second groove side formed in an associated sidewall and extending from the groove bottom toward the inner surface of the associated sidewall, the second groove side being wider than the first groove side; and
    (iii) a third groove side formed in said associated sidewall and extending from the inner surface thereof toward and into intersection with the second groove side, the third groove side being substantially narrower than the first groove side and cooperating with the inner surface of said associated sidewall to define a pointed lip which extends along one side of the miter groove and overhangs the second groove side.

6. The drawer assembly of claim 5 wherein the first and third groove sides extend in substantially parallel planes, and the third groove side has a width which equals about the difference in width between the second and first groove sides.

7. The drawer assembly of claim 5 wherein the first and second groove sides of each groove have an included angle of about 87 degrees between them prior to the strip being folded to form corners.

8. A drawer construction wherein drawer sides and a drawer back are formed integrally from a single, hollow, extruded plastic member, the member having spaced inner and outer walls extending along its length and defining an elongated channel therebetween, the member having a pair of transversely extending miter grooves severing the inner wall at spaced corner locations, the member having its outer wall folded at both corner locations to bring such portions of the inner wall as define opposite sides of each groove together to form corners between the sides and back, the folded configuration of the member being maintained by snap-acting means carried within the elongated channel at each of the corner locations, the snap-acting locking means being operable to maintain the folded configuration of the member once the member is folded from a relatively flat initial configuration to form corners between the drawer sides and back.

9. The drawer construction of claim 8 wherein the locking means are snap-acting devices each having one end portion positioned in the channel of the back and having another end portion configured to project, as by snap-action, into the channel of the associated side when the member is folded to form a corner between the back and said associated side.

10. The drawer construction of claim 8 wherein the snap acting devices are bonded in the channel of the back, and their said another end portions are of U-shaped configuration adapted to compressively engage inside surface portions of the channel formed in their associated sides.

11. The drawer construction of claim 8 additionally including a drawer front connected to the drawer sides by connectors which are secured to an inside surface of the drawer front and which project into the elongated channels formed in the sides, the connectors carrying button-like projections which extend into holes formed in the sides.

12. The drawer construction of claim 11 wherein the inner and outer walls of the drawer sides are interconnected by web members concealed therebetween, and the holes are formed in these web members at locations concealed from view by the inner and outer walls.

13. The drawer construction of claim 8 wherein each of the miter grooves is defined by groove sides of unequal width, including:
  (a) a first groove side formed in the back and extending from the inner surface thereof to a groove bottom near the outer surface thereof;
  (b) a second groove side formed in an associated sidewall and extending from the groove bottom toward the inner surface of the associated sidewall, the second groove side being wider than the first groove side; and
  (c) a third groove side formed in said associated sidewall and extending from the inner surface thereof toward and into intersection with the second groove side, the third groove side being substantially narrower than the first groove side and cooperating with the inner surface of said associated sidewall to define a pointed lip which extends along one side of the miter groove and overhangs the second groove side.

14. The drawer construction of claim 13 wherein the first and third groove sides extend in substantially parallel planes, and the third groove side has a width which equals about the difference in width between the second and first groove sides.

15. The drawer construction of claim 13 wherein the first and second groove sides of each groove have an included angle of about 87 degrees between them prior to the strip being folded to form corners.

16. A tight-fitting, integral corner construction between first and second adjacent parts of a panel of the type having inner and outer side surfaces which are substantially flat and parallel, comprising:
  (a) an elongated, three-sided miter groove extending across the panel on the inner side thereof at a location between the adjacent panel parts, the groove having a substantially uniform cross-section along its length and being defined by groove sides of unequal widths as viewed in cross-section, the groove sides including:

(i) a first groove side formed in the first panel part and extending from the inner surface thereof to a groove bottom near the outer surface;

(ii) a second groove side formed in the second panel part and extending from the groove bottom toward the inner surface of the second panel part, the second groove side being wider than the first groove side;

(iii) a third groove side formed in the second panel part and extending from the inner surface thereof toward and into intersection with the second groove side, the third groove side being substantially narrower than the first groove side and cooperating with the inner surface of the second panel part to define a pointed lip which extends along one side of the miter groove and overhangs the second groove side; and, (b) the panel being folded about the groove bottom to close the groove and position the first and second groove sides closely together with the pointed lip overlying and engaging portions of the inner surface of the first panel part whereby the crack between the first and second groove sides is concealed by the lip.

17. The panel corner construction of claim 16 wherein the first and third groove sides extend in substantially parallel planes, and the third groove side has a width which equals about the difference in widths between the second and first groove sides.

18. The panel corner construction of claim 16 wherein the first groove side is formed such that it is inclined at an angle of about 50 degrees relative to the planes of the inner and outer side surfaces, and the second groove side is formed such that it is inclined at an angle of about 40° relative to the planes of the inner and outer side surfaces, whereby an included angle of about 90° is defined between the planes of the first and second groove sides.

19. The panel corner construction of claim 16 wherein the first and second groove sides are formed with an included angle of about 87° therebetween.

20. The panel corner connection of claim 16 additionally including locking means for maintaining the folded configuration of the panel.

21. The panel corner connection of claim 20 wherein the first and second panel parts have first and second channels formed respectively therein at locations adjacent the miter groove, the first and second channels being arranged to communicate when the panel is in its folded configuration, and the locking means is carried within the channels and is concealed from view when the panel is in its folded configuration.

22. The panel corner connection of claim 21 wherein the locking means is a snap-acting device which has one portion secured in one of the channels and which has another portion that projects by snap-action into the other of the channels when the panel is folded.

* * * * *